United States Patent Office 3,658,914
Patented Apr. 25, 1972

---

3,658,914
POLYPEROXIDES
George P. Gregory, Wilmington, Del., assignor to
Hercules Incorporated, Wilmington, Del.
No Drawing. Continuation-in-part of application Ser. No.
137,744, Sept. 13, 1961, now Patent No. 3,402,205.
This application June 11, 1968, Ser. No. 736,027
Int. Cl. C07l 73/00
U.S. Cl. 260—610 R
2 Claims

ABSTRACT OF THE DISCLOSURE

Organic peroxides of the formula

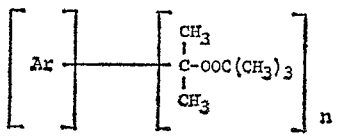

where $n$ is an integer from 2 to 4, and Ar represents a polyvalent aryl group containing 1 to 3 benzene rings are crosslinking agents for polymers.

---

This application is a continuation-in-part of application Ser. No. 137,744, filed Sept. 13, 1961 now Pat. No. 3,402,205.

This invention relates to organic peroxides having low residual odor after thermal decomposition and are particularly useful in the crosslinking of polymers in that they do not impart objectionable odors thereto.

The organic peroxides of this invention are organic polyperoxides in which at least two t-alkylperoxy-α-isopropyl radicals are attached to an aryl group or nucleus. The aryl group contains one or more aryl rings to which the t-alkylperoxy-α-isopropyl radicals are attached.

The organic polyperoxides of this invention are readily prepared, for example, by the steps of: (1) oxidation of a polyisopropyl aryl compound containing at least two isopropyl groups attached to the aryl group, and capable of oxidation to a hydroperoxide, by contacting with elementary oxygen until at least two hydroperoxy groups are formed; (2) reduction of the hydroperoxy compound to the corresponding hydroxy compound; and (3) reaction of the poly(hydroxyisopropyl)aryl compound containing at least two α-hydroxyisopropyl groups with a chemical equivalent quantity of t-alkyl hydroperoxide until an organic peroxide having at least two t-alkylperoxyisopropyl groups attached to the aryl group is produced. The product of this process is useful as a crosslinking catalyst. Specific compounds which can be isolated and defined by chemical formula can also be produced by purification of the intermediates formed in each of the steps and a specific aryl compound to which at least two α-hydroxyisopropyl groups are attached may be made by the above steps and reacted with at least two moles of t-alkyl hydroperoxide to produce a specific aryl compound having at least two t-alkylperoxyisopropyl groups attached thereto.

The reaction steps (1) and (2) of this invention are represented by the following equation:

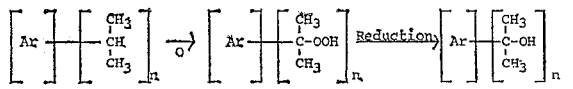

and the last step is represented by the following equation:

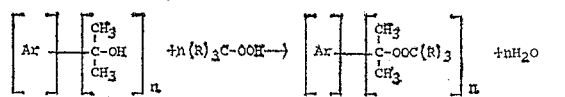

where $n$ represents at least two and not more than four, and where Ar represents a polyvalent (n-valent) aryl group, and $(R)_3C$ represents a t-alkyl group having 4 to 12 carbon atoms. This last reaction is carried out by heating the reactants with an acid-acting condensation catalyst at 50–120° C., preferably 60–100° C. in a volatile organic solvent at reflux while azeotropically distilling off the water, liberated in the reaction. Mixtures, as well as specific poly(α-hydroxyisopropyl)aryl compounds, may be reacted with t-alkyl hydroperoxide to produce specific peroxides of this invention, however, and their structures are well defined. The general procedure of this step is described in U.S. 2,668,180.

The preparation of aryl compounds of the formula

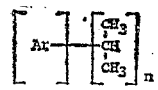

by alkylation of aryl compounds with propylene so as to introduce at least two isopropyl groups attached to the aryl nucleus so as to produce such a compound is well known. Aluminum chloride and boron trifluoride are typical catalysts for this reaction. The isomers produced in this reaction need not be separated, but can be separated if desired.

Oxidation of these isopropyl aryl compounds to produce hydroperoxides thereof by means of elementary oxygen is well known in the art as exemplified by U.S. 2,438,125; U.S. 2,547,938; U.S. 2,548,435; U.S. 2,632,774; U.S. 2,664,447; U.S. 2,856,433 and Re. 23,916.

The hydroperoxides formed in the oxidation may be reduced by reaction with metal sulfides, by reaction with hydrogen and a catalyst, electrolytically by an electric current or by an electromotive couple, by thermal decomposition in the presence of alkalies or by giving up oxygen to a receptive hydrocarbon in the presence of heavy metal catalysts, sodium alkoxides or sodium hydroxide. The latter method is preferable, since the oxidation step and the hydroperoxide reduction step may be carried out simultaneously simply by contacting the propylated aryl compound with elementary oxygen in the presence of strong alkali such as sodium hydroxide.

The process of preparing the organic peroxides of this invention is illustrated by the following examples in which all parts and percentages are by weight.

EXAMPLE 1

Refinery gas (3 parts propylene:1 part ethylene) was passed into 117 parts benzene containing 73.5 parts 80% sulfuric acid at about 5° C. until 126 parts of the refinery gas had reacted. The effluent gas contained propylene and ethylene in a lower ratio. The liquid reaction mixture was poured into cold water, washed with water, and distilled from lime .The diisopropylbenzene fraction was recovered, mixed with 0.4 mole percent of AlCl₃ at 40° C. The temperature was then raised to 60–65° C. for ½ hour to isomerize the diisopropylbenzene to increase the amount of meta isomer. This reaction mixture was washed with water and then with alkali and distilled to separate the m-diisopropylbenzene.

To a vigorously stirred mixture of 1,000 parts m-diisopropylbenzene and 500 parts 2% aqueous sodium hydroxide was added a finely divided stream of air while maintaining a temperature of 60–80° C. When the concentration of hydroperoxide reached 45%, the hydroperoxide solution was separated from the aqueous sodium hydroxide solution and added gradually with rapid agitation to a solution of 275 parts sodium sulfide nonahydrate in 830 parts water while heating at 90–100° C. After 3 hours' heating, the hydroperoxide content was substantially zero. The aqueous layer was then separated, and the organic layer was made slightly alkaline with 5% sodium hydroxide and steam distilled to remove about 50% of the organic material. The residual organic material was crystallized, and 350 parts crystalline m-bis(hydroxyisopropyl)benzene was recovered.

A mixture of 49.5 parts m-bis(hydroxyisopropyl)benzene, 54.7 parts t-butyl hydroperoxide, 130 parts benzene, and 130 parts anhydrous ethanol, in which 1.8 parts p-toluene sulfonic acid was dissolved, was heated at 70–80° C. with stirring for 14 hours under a reflux condenser fitted for water removal from the refluxing azeotrope. The progress of this reaction was followed by measuring the rate of water evolution. After 3.6 hours, the reaction was essentially complete, and the peroxide content was essentially 90% in the form of peroxide. The whole reaction mixture was washed with several portions of 5% sodium hydroxide until neutral, and then with water to remove the alcohol and residual alkali. The benzene was distilled off from the organic layer under reduced pressure. The residue was m-bis(t-butylperoxyisopropyl)benzene of practical grade.

EXAMPLE 2 m-Diisopropylbenzene was prepared by alkylation of benzene as in Example 1 and was separated by fractional distillation from its isomers. This m-diisopropylbenzene was then oxidized by contacting with air while vigorously stirring in the presence of aqueous concentrated sodium hydroxide. The hydroperoxide formed was continuously reduced in this process by reaction with excess m-diisopropylbenzene and alkali, and the last of the hydroperoxide was reduced by continuing to heat without addition of oxygen so as to avoid further hydroperoxide formation. The m-bis(hydroxyisopropyl)benzene so formed was concentrated by steam distilling unreacted m-diisopropylbenzene from the reaction mixture and, on cooling the m-bis(hydroxyisopropyl)benzene, crystallized out.

A mixture of 48 parts m-bis(hydroxyisopropyl)benzene, 54 parts 89% t-butyl hydroperoxide, 520 parts anhydrous alcohol, 0.7 part p-toluene sulfonic acid, and 30 parts hexane was heated at 70–79° C. under reflux with continuous removal of water evolved. At the end of 5 hours, water evolution had ceased and only 4% of the original hydroperoxide remained. The product recovered as in Example 1 amounted to 62.4 parts. This was analyzed by means of Craig countercurrent extraction between isooctane and acetonitrile. There was a polar peak amounting to about 16% containing m-t-butylperoxyisopropyl(hydroxyisopropyl)benzene and a nonpolar peak of about 82% containing mostly m-bis(t-butylperoxyisoproyl)benzene (97% ±2) was characterized by an ultraviolet absorption spectrum showing a single peak at 260 m$\mu$ and by an infrared absorption having no OH or CO absorption bands. It analyzed: 71.8% C, 10.4% H, and 18.3% O; mol. wt. (acetone), 328 corresponding fairly well with that for $C_{20}H_{34}O_4$. Its physical characteristics are: $d_4^{24.3}$ (supercooled)=0.9361; $n_D^{20}$ (supercooled)=1.4718; M.P. 49–52° C.

EXAMPLE 3

The procedure of Example 1, repeated using biphenyl in place of benzene in the propylation step, yields as final product a peroxidic material containing a compound identified as bis(t-butylperoxyisopropyl)diphenyl.

EXAMPLE 4

The procedure of Example 1, repeated using naphthalene in place of benzene in the propylation step, yields as final product a peroxidic material containing a compound identified as bis(t-butylperoxyisopropyl)naphthalene.

EXAMPLE 5

The procedure of Example 1, repeated using diphenyl ether in place of benzene in the propylation step, yields as final product a peroxidic material containing a compound identified as bis(t-butylperoxyisopropyl)diphenyl ether.

EXAMPLE 6

The procedure of Example 1, repeated using durene in place of benzene in the propylation step, yields as final product a compound identified as bis(t-butylperoxyisopropyl)durene.

EXAMPLE 7

The procedure of Example 1, repeated using benzene and propylating to the stage of introduction of three isopropyl groups so that the product oxidized to the hydroperoxide was a triisopropylbenzene mixture, yields as final product a peroxidic material rich in isopropyl bis(t-butylperoxyisopropyl)benzene, but also containing some tris(t-butylperoxyisopropyl)benzene, some isopropenyl bis(t-butylperoxyisopropyl)benzene, and some hydroxyisopropyl bis(t-butylperoxyisopropyl)benzene in addition.

EXAMPLE 8

In a round-bottom flask fitted with a reflux condenser having a water-takeoff device was placed 19.8 parts m-bis(hydroxyisopropyl)benzene of 98% purity, 71.5 parts p-menthyl hydroperoxide mixed isomers of 53% purity in hydroperoxide content, 52.0 parts anhydrous ethanol, and 0.24 part p-toluene sulfonic acid(monohydrate). This mixture was refluxed at 71–75° C. with water takeoff for 20 hours, additional portions of 0.1 part each of p-toluene sulfonic acid being added every 4 hours. To this reaction mixture was then added 88 parts benzene, and the solution was neutralized with 5% sodium hydroxide solution and washed with water until sodium-free. The solvent was then distilled off, and 54.1 parts bis-m-(p-menthylperoxyisopropyl)benzene was recovered.

EXAMPLE 9

A solution of 15.8 parts m-bis(hydroxyisopropyl)benzene of 98% purity, 39 parts p-menthane hydroperoxide of 84% purity and 0.3 part p-toluene sulfonic acid monohydrate in 17 parts hexane was heated at about 75° C. for 6 hours, a second portion of 0.5 part p-toluene sulfonic acid being added after the first 3 hours of heating. The water of reaction separated from the hexane solution. The organic solution was then neutralized with 5% sodium hydroxide and washed sodium-free with water. After distilling off the hexane, there was obtained 54 parts of a mixture containing 60.8% m-bis(p-menthylperoxyisopropyl)benzene. The refractive index of this residue was $n_D^{20}$= 1.498, $d_4^{20}$=0.978.

EXAMPLE 10

A solution of 2.5 parts 1,3,5-tris(hydroxyisopropyl)-benzene, prepared by oxidation of 1,3,5-triisopropylbenzene with air in the presence of a sodium hydroxide dispersion and reduction of the 1,3,5-tris(hydroperoxyisopropyl)benzene, and 3.6 parts 90% t-butylhydroperoxide in 8 parts anhydrous ethanol was heated at 72–75° C. with 0.1 part p-toluene sulfonic acid for 6 hours. The reaction mixture was dissolved in 40 parts benzene, neutralized with 5% aqueous sodium hydroxide, and washed with water until sodium-free. The residue after distilling off the solvent was a viscous liquid analyzing 63% 1,3,5-tris(t-butylperoxyisopropyl)benzene.

In this preparation, 1,3,5-tris(hydroxyisopropyl)benzene made by other methods, such as by reaction of methyl magnesium bromide with 1,3,5-triacetylbenzene, works equally well in the reaction with t-butyl hydroperoxide for production of the poly(t-butylperoxyisopropyl)aryl compounds having two or more peroxide groups attached to the aryl nucleus.

EXAMPLE 11 p-Isopropylbenzene sulfonyl chloride was prepared in about 90% yield by adding 350 parts chlorosulfonic acid gradually to a stirred solution of 120 parts cumene in 375 parts methylene chloride at 0–10° C. The resulting mixture was washed with water and dried. From this mixture, 199 parts p-isopropylbenzene sulfonyl chloride was recovered.

Bis(p-isopropylphenyl)sulfone was prepared by adding 102 parts cumene in 75 parts methylene chloride to a stirred mixture of 110 parts aluminum chloride in a solution of 185.3 parts p-isopropylbenzene sulfonyl chloride in 300 parts methylene chloride at 0–5° C. This reaction mixture, after warming to room temperature and stirring for a 16-hour period, was diluted with water and washed with 4% aqueous sodium hydroxide and with water. After removal of the methylene chloride, 248 parts bis(p-isopropylphenyl)sulfone was recovered. Its melting point was 109–110° C.

Bis(p-isopropylphenyl)sulfone was oxidized to bis(p-α-hydroxyisopropylphenyl)sulfone by stirring vigorously a mixture of 100 parts of bis(p-isopropylphenyl)sulfone and 50 parts of 50% aqueous sodium hydroxide at 105–138° C. for 14 hours in an oxygen atmosphere at atmospheric pressure. The product was purified by subjecting to countercurrent distribution between ether and ethylene glycol. The most polar part was then crystallized from ether. The recrystallized bis(p - α-hydroxyisopropylphenyl)sulfone melted at 139–140° C.

Bis(p-α-t-butylperoxyisopropylphenyl)sulfone was prepared by heating 22 parts bis(p-α-hydroxyisopropylphenyl)sulfone and 100 parts t-butyl hydroperoxide in 100 parts heptane at 49–69° C. under reduced pressure, with 0.38 part p-toluene sulfonic acid and about 0.2 part 96% sulfuric acid. The reaction was stopped when water was no longer azeotropically distilling off. The resulting solution was freed of acid by washing with 8% aqueous sodium hydroxide and then with water. Infrared and iodometric analyses indicate a 30% yield of bisperoxide.

EXAMPLE 12

Dicumylmethane was prepared by mixing 180 parts trioxane and 120 parts zinc chloride with 862 parts cumene and passing hydrogen chloride gas into the mixture at 10–35° C. until saturated with hydrogen chloride. The aqueous zinc chloride phase was separated, and 15 parts anhydrous aluminum chloride and 20 parts nitromethane were added. The reaction mixture was allowed to react 16 hours at 25° C., and 5 parts more aluminum chloride was added and reaction was continued with stirring first at 37° C. and finally at 45° C. The final reaction mixture was washed with water and with aqueous sodium hydroxide and dried. This product, after removing cumene, was a mixture of isomers of dicumylmethane of which 75.1% was p-, p'-; 18.8% was m-, p'-; 5.1% was m-, m'-; and 1.0% was o-, p'-.

This dicumylmethane mixture was oxidized by contacting vigorously 65 parts of the mixture and 3 parts calcium hydroxide with oxygen gas at atmospheric pressure for 13.5 hours at 120–140° C. The lime was removed by filtration, and the product was purified by distribution between ether and ethylene glycol. The most polar fraction amounting to 32 parts was bis(α-hydroxyisopropylphenyl)ketone.

Bis(α-t-butylperoxyisopropylphenyl)ketone was prepared by heating 30 parts of the above bis (α-hydroxyisopropylphenyl)ketone with 56.3 parts 82% t-butyl hydroperoxide, and 0.57 part p-toluenesulfonic acid in 100 parts of heptane at 48–50° C. under reflux with water collection for 3.5 hours. The reaction was terminated when no more water was evolved. The reaction mixture was washed free of acid and excess t-butylhydroperoxide with water and 8% aqueous sodium hydroxide solution. After removal of the heptane, the bis(α-t-butylperoxyisopropylphenyl) ketone was recovered as a product, the yield of which was shown by infrared and iodometric analyses to be 19.2%. This product may also be called bis(α-t-butylperoxyisopropyl)benzophenone.

EXAMPLE 13

2,2-diphenylpropane was prepared by adding 135 parts α-methylstyrene dropwise to a saturated solution of hydrogen chloride in 240 parts benzene at 0–5° C., and then adding more hydrogen chloride gas until absorption stopped, and then adding this solution to 2400 parts benzene saturated with hydrogen chloride, and containing 24 parts aluminum chloride and 30 parts nitromethane at 0° C. and stirring for 1.5 hours at 0–5° C. The 2,2-diphenylpropane was recovered by washing the reaction product with water, distilling off the benzene and then washing with 96% sulfuric acid and finally with water. The yield was about 218 parts.

2,2-bis(p-acetylphenyl)propane was produced by adding 49 parts 2,2-diphenylpropane dropwise with stirring at 5–10° C. to a mixture of 43 parts acetyl chloride and 73.5 parts aluminum chloride in 120 parts nitrobenzene and then warming gradually to room temperature, and finally heating at 85–95° C. for 3 hours, and the product was recovered by washing with water and finally distilling. The yield of 2,2-bis(p-acetylphenyl)propane was 51.1 parts having a purity of better than 92%. The melting point of a purified sample was 67° C.

2,2-bis(α-hydroxy-p-isopropylphenyl)propane was prepared by adding 28 parts 2,2-bis(p-acetylphenyl)propane in 50 parts ether gradually to methyl magnesium iodide in ether prepared by reacting 5.35 parts magnesium turnings with 31.24 parts methyl iodide in 40 parts ether and finally heating at 50° C. for one hour. The product was recovered by washing the ether solution with aqueous ammonium chloride and then with water followed by distilling off the ether. The yield of 2,2-bis(α-hydroxy-p-isopropylphenyl)propane was 28.6 parts, a sample of which, after crystallization from a hexane-ether-acetone mixture, melted at 115–116° C.

2,2-bis(α-t-butylperoxy-p-isopropylphenyl)propane was prepared by refluxing at 50° C. a heptane solution of 14 parts 2,2-bis(α-hydroxy-p-isopropylphenyl)propane, M.P. 115–116° C., 25 parts 82% t-butylhydroperoxide and 0.25 part p-toluenesulfonic acid in 80 parts heptane with azeotropic removal of water until water separation ceased. The resulting 2,2 - bis(α-t-butylperoxy-p-isopropylphenyl)propane was recovered by washing with 8% sodium hydroxide solution and then with water, and then distilling off the heptane. It was a solid having a purity by peroxide analysis of 84.4%.

The poly(t-alkylperoxyisopropyl)aryl compounds of this invention have the general formula

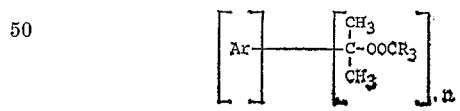

where $n$ is at least 2 and not more than 4, Ar is an aryl nucleus containing 1 to 3 benzene rings, and the R groups are individual cyclic or acyclic alkyl groups which may be the same or different and, when two are taken together, may constitute a divalent cycloalkyl group of which the carbon to which the other R group is attached is a ring member. The aryl nucleus of these compounds includes the benzene, naphthalene, phenanthrene, diphenyl, and terphenyl rings, which may be in part substituted with alkyl groups, and includes also compounds of the general formula [Ar'—x—Ar"] where Ar' and Ar" may be an alkyl substituted or unsubstituted benzene, naphthalene, phenanthrene, diphenyl or terphenyl ring, and x is a copulating group. The operable copulating groups are —O—, —CH$_2$—, (CH$_3$)$_2$C=, =CO, =SO$_2$,

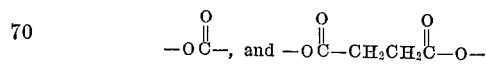

The isopropyl groups may be on adjacent carbons or may be separated from each other, and may even be in widely separated positions in the aryl group, as when they are attached to different rings.

The Ar group in the compounds of this invention is broad in scope, since its essential purpose is to carry the

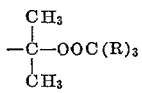

groups and provide an odorless residue in the products of decomposition of the peroxides. The poly(t-alkylperoxyisopropyl)aryl compounds will thus have the general formula

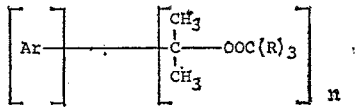

in which the Ar group is exemplified by: (1) containing one benzene ring, $C_6H_4<$, $CH_3C_6H_3<$, $(CH_3)_2C_6H_2<$, $C_6H_3\equiv$, $(CH_3)_3C_6H<$, $(CH_3)_4C_6<$, $(CH_3)_2CHC_6H_3<$, $$(CH_3)_3C-C_6H_3<$$

$(CH_3)_2C(OH)C_6H_3<$, $((CH_3)C=CH_2)C_6H_3<$; (2) containing 2 benzene rings, $C_6H_5-C_6H_3<$,

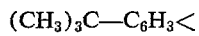

$>C_6H_3-C_6H_3<$, $-C_6H_4-C_6H_3<$, $C_{10}H_6<$ (naphthalene ring), $C_{10}H_5\equiv$, $C_{14}H_8<$ (anthracene ring), $C_{14}H_5\equiv$,

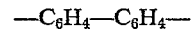

$=C_6H_3-x-C_6H_4-$, $=C_6H_3-x-C_6H_3=$, $$C_6H_5-x-C_6H_2\equiv$$

and $-C_6H_4-x-C_6H_2\equiv$, where $x$ is one of the copulating groups set forth above; (3) containing 3 benzene rings, $C_{14}H_8<$ (phenanthrene), $C_{18}H_{12}<$ (terphenyl) and the corresponding aryl groups containing lower alkyl substituents of 1-4 carbons where such substitution is possible.

The aryl group containing two benzene rings will have the rings fused to each other as in the naphthalene and anthracene groups, attached to each other by a common bond as in the diphenyl group, or separated from each other by at least one atom as in the $Ar'-x-Ar''$ groups.

The polyisopropyl aryl compounds which are oxidized in the first step of the process of this invention may be made by propylation of an aryl compound of the formula Ar—H where Ar represents the same aryl nuclei as set forth above, or they may be made by indirect means, particularly in the case of compounds of the formula $Ar'-x-Ar''$ where the $x$ group is introduced by coupling $Ar'(C_3H_7)_m$ or $Ar''(C_3H_7)_m$ by known means, $m$ being a number indicating the number of isopropyl groups present. Where $x$ is $-O-$, $-CH_2-$, $(CH_3)_2C=$ or $>CO$, the isopropyl groups may be introduced by propylation of the unpropylated compounds. Where $x$ is $-O-$, this linkage may be put in last by the same type of reactions as are used for producing diphenyl ether, such as for example, by heating a sodium isopropylphenoxide with an isopropylchlorobenzene. For the case where $x$ is $-CH_2-$, $$Ar'(C_3H_7)_mCH_2Cl$$

may be reacted with $Ar''(C_3H_7)_m$ in the presence of $AlCl_3$ or $BF_3$. For the case where $x$ is $(CH_3)_2C=$, $Ar'(C_3H_7)_m$ may be reacted with acetone in the presence of sulfuric acid. For the case where $x$ is $-CO-$, $Ar'(C_3H_7)_m$ may be reacted with phosgene in the presence of $AlCl_3$, or $Ar'(C_3H_7)_mCOCl$ may be reacted with $Ar(C_3H_7)_m$ in the presence of $AlCl_3$ or $BF_3$. For the case where $x$ is $-SO_2-$, a sulfonyl chloride, $$Ar'(C_3H_7)_mSO_2Cl$$

is reacted with $Ar''(C_3H_7)_m$. For the case where

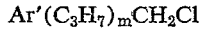

an acid, $Ar'(C_3H_7)_mCOOH$, may be esterified with a phenol, $Ar''(C_3H_7)_mOH$. For the case where

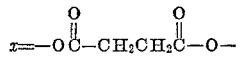

a phenol, $Ar'(C_3H_7)_mOH$, may be reacted with succinic acid or its anhydride. In all of these cases, it is understood that all or part of the isopropyl groups may be in a single moiety of the aryl compound. In all cases, the sum of $m$ values in both moieties equals $n$.

In the oxidation to the hydroperoxide and in reduction of the hydroperoxide to the poly(hydroxyisopropyl)aryl compounds, as well as in the reaction of the latter with the tertiary alkyl hydroperoxide, there is no significant change in the Ar group through the various steps other than those indicated above. Thus, diisopropylbenzene is oxidized to diisopropylbenzene dihydroperoxide, and this is reduced to the xylylene dialcohol. Similarly, triisopropylbenzene may be oxidized to a mixture containing a small amount of monohydroperoxide, a small amount of trihydroperoxide, and a large amount of dihydroperoxide, and this on reduction will produce a corresponding mixture of carbinols which is reacted with t-alkyl hydroperoxide to give a mixture rich in the organic peroxides of this invention, which has the advantageous properties of the pure peroxides.

The t-alkyl group introduced into the compounds of this invention by the t-alkyl hydroperoxide is illustrated by the following: t-butyl, t-amyl, t-hexyl (3 isomers), t-heptyl (6 isomers), t-octyl, t-nonyl, t-decyl, t-dodecyl, t-cyclohexyl (e.g., 1-methylcyclohexyl), p-menthyl (1-, 7- and 8-isomers), pinanyl (pinane ring). In each case, it is the tertiary-alkyl hydroperoxide which is reacted with the poly(hydroxyisopropyl)aryl compound to produce the poly(t-alkylisopropyl)aryl compound of this invention.

The acid-acting condensation catalyst used in the peroxide condensation step of the process of this invention is any of the well-known, acid-acting, condensation catalysts, such as Friedel-Crafts type catalysts including $BF_3$, ether complexes of $BF_3$, organic acid complexes of $BF_3$, halides of metals whose hydroxides are amphoteric, such as $AlCl_3$, $ZnCl_2$, $SnCl_4$, $TiCl_4$, etc., and mineral acid condensation catalysts such as $HF$, $HBF_4$, $H_2SO_4$, $H_3PO_4$, organic sulfonic acids, organic acid sulfates, aromatic sulfonic acids, including benzene, toluene, and naphthalene sulfonic acids. A catalyst, such as the organic sulfonic acids, which is soluble in the solvent vehicle of the reaction, is preferred.

The amount of acid-acting condensation catalyst will be small so as to avoid degradation of the peroxide, the useful amount being in the range of 0.001% to 1.0% based on the weight of the reactants.

In carrying out the process of this invention, a slight excess (up to about 10%) of t-alkyl hydroperoxide is used for best yields.

A solvent boiling in the range of 50–120° C. is advantageously used in the peroxide-forming step of the process of this invention so as to drive off the water produced in the reaction. The solvent may be selected from the following: saturated aliphatic hydrocarbons such as a pentane cut, a hexane cut, a heptane cut, a gasoline cut or a naphtha cut, benzene, toluene, xylenes, cumene, carbon tetrachloride, ethylene chloride, and the like. If desired, reduced pressure may be used to aid in azeotropic distillation of the water produced. In order to promote homogeneity of the reaction mixture, ethanol is also advantageously added.

The polymers which may be cured by means of the poly(t-alkylperoxy)aryl compounds of this invention are: natural rubber, polyethylene, polyisoprene, poly(vinyl chloride), polystyrene, copolymers of ethylene and propylene (EPR), cis-4-polybutadiene, poly(chloroprene), poly(dimethyl siloxane), GR–S (butadiene-styrene copolymer) and GR–N or Buna–N (butadiene-acrylonitrile copolymer).

All of the peroxides of the specific examples are good crosslinking agents for both natural and black-filled low density polyethylene. All of the peroxides have about the same half-life. None of the cured polymers had a disagreeable odor.

What I claim and desire to protect by Letters Patent is:
1. 2,2 - bis(alpha - t - butylperoxy-p-isopropylphenyl)-propane.
2. 1,3,5 - tris[alpha,alpha - dimethyl - alpha - (t-butylperoxy)methyl]benzene.

References Cited
UNITED STATES PATENTS

| | | | |
|---|---|---|---|
| 3,118,866 | 1/1964 | Gregorian | 260—610 R UX |
| 3,402,205 | 9/1968 | Gregory | 260—610 |

HOWARD T. MARS, Primary Examiner

U.S. Cl. X.R.

260—41 R, 80 R, 82.1, 82.3, 94.2, 94.91 A, 590, 607 A